United States Patent
Godo

(10) Patent No.: US 7,875,993 B2
(45) Date of Patent: *Jan. 25, 2011

(54) POWER SWITCHING SYSTEM AND METHOD FOR AN AIRCRAFT ELECTRICAL BRAKE SYSTEM

(75) Inventor: Erik Godo, Redmond, WA (US)

(73) Assignee: The Boeing Company, Chicago, IL (US)

(*) Notice: Subject to any disclaimer, the term of this patent is extended or adjusted under 35 U.S.C. 154(b) by 592 days.

This patent is subject to a terminal disclaimer.

(21) Appl. No.: 11/615,889

(22) Filed: Dec. 22, 2006

(65) Prior Publication Data

US 2008/0157590 A1    Jul. 3, 2008

(51) Int. Cl.
*B60L 1/00* (2006.01)
(52) U.S. Cl. .......................... 307/9.1; 701/70
(58) Field of Classification Search ............... 307/9.1; 188/72.1, 72.7–72.9; 701/3, 70
See application file for complete search history.

(56) References Cited

U.S. PATENT DOCUMENTS

| | | | |
|---|---|---|---|
| 6,095,293 A | 8/2000 | Brundrett et al. | |
| 6,702,069 B2* | 3/2004 | Ralea et al. | 188/71.5 |
| 2002/0185992 A1* | 12/2002 | Kouwa | 322/28 |
| 2003/0068981 A1* | 4/2003 | Duthie | 455/67.1 |
| 2004/0154880 A1* | 8/2004 | Guaraldo | 188/71.5 |
| 2006/0028327 A1* | 2/2006 | Amis | 340/431 |
| 2007/0102998 A1* | 5/2007 | Jordan et al. | 307/9.1 |
| 2008/0142318 A1* | 6/2008 | Griffith et al. | 188/158 |

OTHER PUBLICATIONS

PCT, US2007/088465, PCT International Search Report, Dec. 4, 2008.

* cited by examiner

*Primary Examiner*—Khoi Tran
*Assistant Examiner*—Rodney King
(74) *Attorney, Agent, or Firm*—Tung & Associates

(57) ABSTRACT

A system and method for switching power sources for an aircraft electric brake system is disclosed. The method removes battery power from electric brake actuator controls during flight until landing gear extension occurs. The method utilizes a logic circuit to switch between available power sources based on a plurality of control signals. The method minimizes the total power drawn during flight, and saves battery power if the aircraft calls for operating on battery power only.

19 Claims, 3 Drawing Sheets

POWER SWITCHING SYSTEM AND METHOD FOR AN AIRCRAFT ELECTRICAL BRAKE SYSTEM

TECHNICAL FIELD

Embodiments of the present invention relate generally to aircraft power systems, and more particularly to aircraft electrical brake control power systems.

BACKGROUND

Historically aircraft braking control has been operated via direct cable or hydraulic connection. Cable and hydraulic control connections suffered from weight, performance and reliability issues. Many of these issues have been improved upon by using electrically actuated and controlled brake systems. Electrically actuated and controlled brake systems are colloquially referred to as "brake by wire" systems.

A brake by wire system is usually electrically powered by both the aircraft system power and a backup battery. An electric brake actuation unit (EBAC) is a high power subsystem of a brake by wire system. The EBAC and other loads are connected to the battery during flight. The battery supplies backup power to its connected loads so if a loss of active power occurs in flight, the battery can support those loads that are fed by it. The battery is connected to the loads by a switch that is usually on in flight.

Because braking is not required during flight, it is desirable to remove the power from the EBAC so that power is saved in flight for use by other loads. Other desirable features and characteristics of embodiments of the present invention will become apparent from the subsequent detailed description and the appended claims, taken in conjunction with the accompanying drawings and the foregoing technical field and background.

BRIEF SUMMARY

A system and method for switching power for an aircraft electric brake system is disclosed. The method receives control signals from the aircraft electric brake system and utilizes a logic circuit to switch between active power supply units and a battery power supply unit based upon the control signals. The method removes the battery power from the EBACs during flight thereby minimizing total power drawn on the battery power supply unit, and saving the battery power unless the aircraft operation calls for operating on battery power only.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
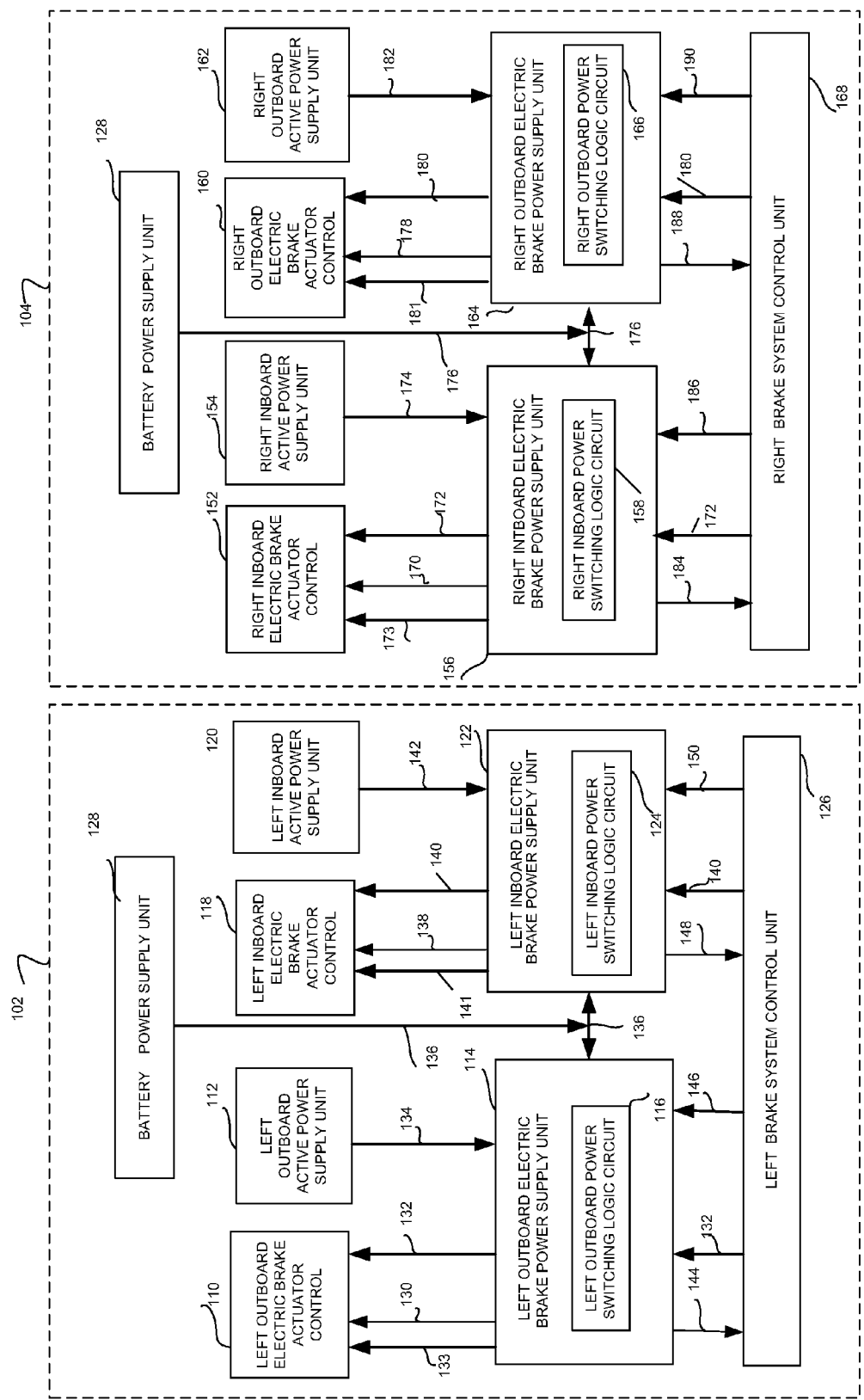
FIG. 1 is a schematic representation of a power switching system for an aircraft electric brake system.

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various electric brake actuators, integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of digital data transmission protocols and/or aircraft configurations, and that the system described herein is merely one example embodiment of the invention.

For the sake of brevity, conventional techniques and components related to signal processing, aircraft braking, braking control, and other functional aspects of the systems and the individual operating components of the systems may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to or directly communicates with another element/node/feature, and not necessarily mechanically. Likewise, unless expressly stated otherwise, "coupled" means that one element/node/feature is directly or indirectly joined to or directly or indirectly communicates with another element/node/feature, and not necessarily mechanically. Thus, although the schematics shown in the figures depict example arrangements of elements, additional intervening elements, devices, features, or components may be present in an embodiment of the invention (assuming that the functionality of the system is not adversely affected).

Embodiments of the invention are described herein in the context of one practical application, namely, a power switching system for an aircraft braking system. In this context, the example technique is applicable to provide redundancy and avoid inadvertent brake application on an aircraft. Embodiments of the invention, however, are not limited to such aircraft applications, and the techniques described herein may also be utilized in other applications.

In one embodiment, an electric brake actuator control (EBAC) is a high power device that consumes 4 kW peak power. This power consumption necessitates the EBAC being actively cooled by forced air in the airplane. Critical avionics must be able to survive a loss of cooling system event until landing is accomplished. By turning off the EBAC during flight until landing gear extension, most of the time is eliminated when an EBAC would need to withstand the loss of cooling event. Also, by removing the EBAC power from the power system until landing gear extension, total power draw on the battery is minimized for certain operational modes, such as when the airplane operates only from battery power.

Additionally, by turning power to the EBAC completely off, an EBAC will not draw any power in what would be a low power sleep mode which could be used during aircraft towing, and will save battery power unless braking is commanded. In one embodiment, the power switching function is performed by electric brake power supply units (EBPSUs) as explained in detail in the context of FIGS. 1-3 below.

FIG. 1 is a schematic representation of a power switching system 100 suitable for use with an aircraft electrical braking system. As shown in FIG. 1, the example power switching system includes a left side power switching configuration 102 configured to switch power for the left side electrical braking subsystem, and a right side electric power switching configuration 104 configured to switch power for the right side electrical braking subsystem. In this regard, having separate EBPSUs improves system availability and reliability.

The system described herein can be applied to any number of power switching configurations for an aircraft, and system 100 for switching power for an aircraft electric brake system is depicted in a generic manner to illustrate its deployment flexibility. In this example, the system 100 may include a left side power switching configuration 102 and a right side power switching configuration 104. The terms "left" and "right" as used herein refer to the port and starboard of the aircraft respectively relative to the center line of the plane. These terms are used herein for convenience of description and are not intended to limit or restrict the scope or application of the invention in any way. In practice, the two architectures may be independently controlled in the manner described below. In operation, each power switching system can independently switch power.

The left side power switching configuration 102 may generally include: at least one left brake system control unit ("BSCU") 126, at least one left EBAC 110/118, at least one left EBPSU 114/122 which includes at least one left power switching logic circuit 116/124, at least one active power supply unit 112/120, and a battery power supply unit 128. This configuration 102 may be adapted to receive, transmit, exchange, or otherwise process a number of data and/or control signals. These signals may include, without limitation: at least one active power signal 134/142, a battery power signal 136, at least one left BSCU battery power enable/disable signal 146/150, at least one left braking event signal 132/140, at least one left braking power signal 133/141, a battery ON/OFF switch signal (not shown in FIG. 1), and at least one power distribution signal (reference numbers 130/144/138/148).

An embodiment may use any number of BSCUs but the example described below uses only one left side BSCU 126. The left BSCU 126 is an electronic control unit that has embedded software to digitally compute the braking command. The electrical/software implementation allows further optimization and customization of braking performance and feel. The left BSCU 126 may be generally realized by a microcontroller, which includes suitable processing logic and software that is configured to carry out the left BSCU 126 operations described herein. The microcontroller may be a computer such as, without limitation, a PowerPC 555 that hosts software and provides external interfaces for the software. The left BSCU 126 monitors various airplane inputs to provide control functions such as, without limitation, pedal braking, parking braking, autobrake and gear retract braking for the left side electrical braking subsystem. In addition, the left BSCU 126 blends the antiskid command (which could be generated internal or external from the BSCU provide optimal control of braking). The left BSCU 126 obtains pedal control signals and wheel data such as wheel speed, rotational direction value for the wheels, and tire pressure. The left BSCU 126 processes its input signals and generates one or more left BSCU 126 output signals that are used as input to the left EBACs 110/118. The left BSCU 126 can generate independent output signals for use by the left EBACs 110/118 under its control. The left BSCU 126 may be coupled to one or more left EBACs 110/118.

In connection with the power switching technique described herein, the left BSCU is configured to generate at least one left BSCU battery power enable/disable signal 146/150, wherein the at least one left BSCU battery power enable/disable signal 146/150 is configured to switch the battery power off to disconnect power from the at least one left EBAC 110/118 and/or the left BSCU 126.

Each of the left EBACs 110/118 may be realized as a microcontroller which includes suitable processing logic and software that is configured to carry out the EBAC operations described herein. The microcontroller may be a computer such as, without limitation, a PowerPC 555 that hosts software and provides external interfaces for the software. Each EBAC 110/118 obtains BSCU output signals, processes those signals, and generates the actuator signals that are used to control the brake mechanisms for landing gear wheels.

The at least one left EBPSU 114/122 is coupled to at least one left EBAC 110/118 and to left BSCU 126. The at least one left EBPSU 114/122 is configured to supply power to the left BSCU 126, and to the at least one left EBAC 110/118. The left EBPSUs 114/122 supply 28 volt power to the left BSCU 126 and the left EBACs 110/118 via the power distribution signals (reference numbers 130/144/138/148). Each of the EPBSUs 114/122 includes and/or communicates with the at least one left power switching logic circuit 116/124.

The at least one left power switching logic circuit 116/124 is configured to switch (connect/disconnect) the battery power supply unit 128, and the active power supply units 112/120 for the left EBACs 110/118 and the left BSCU 126 as needed in the manner described in more detail in the context of FIGS. 2-3 below.

The battery power supply unit 128 is configured to supply power to the at least one left EBPSU. In this example, there is only one battery power supply unit 128 powering the left electric brake system components. Usually during the flight, the battery power supply unit 128 supplies power to the loads that are connected to it, so that if a loss of active power occurs in flight, the battery can support those loads that are fed by it. In this regard, when the active power sources are invalid, the battery will be supplying power continually. However, battery power supply unit 128 can supply power to the aircraft for a few minutes without the aircraft engines running. After the few minutes, the active power sources (powered by a ram air turbine that extends out of the aircraft) power the aircraft loads.

The at least one left active power supply unit 112/120 is coupled to the at least one left EBPSU 114/122 and is configured to supply active power for the at least one left EBAC 110/118. The active power supply unit 112/120, may be supplied/controlled, without limitation, for example by a transmitter/rectifier unit (TRU). Each individual left EBAC 110/118 may switch to obtain power from the battery power supply unit 128 or from the left active power supply unit 112/120, unless a failure is indicated in one of the left active power supply units 112/120 in which case the left EBAC 110/118 gets power from the battery power supply unit 128. The failure/validity of the left active power supply unit 112/120 may be determined by examining the left active power signal 134/142.

The at least one left active power signal 134/142 is generated by the at least one left active power supply unit 112/120 and is indicative of validity of the at least one left active power supply unit 134/142. The active power signal 134/142 may be, for example, about 28 volts.

The left battery power signal 136 is generated by the battery power supply unit 128 and is indicative of validity of the battery power supply unit 128. The left battery power signal 136 may be, for example, about 28 volts. The battery power signal may be turned on or off by the battery ON/OFF switch.

The battery ON/OFF switch signal (not shown in FIG. 1) is configured to initiate connecting/disconnecting the battery power supply unit 128 to/from the at least one left EBAC 110/118. The battery ON/OFF switch is controlled externally by a battery switch (not shown in FIG. 1). The battery switch may be located in a cockpit of the aircraft and is usually on during the flight. In this regard, when the active power sources are invalid, the battery will be supplying power for a limited time, as mentioned above, after which the active power sources power the aircraft loads.

The at least one left BSCU battery power enable/disable signal 146/150 is generated by the left BSCU 126 and is configured to disconnect/connect the battery power supply unit 128 from/to the at least one left EBAC 110/118. The left BSCU battery power enable/disable signal 146/150 is used by the left BSCU 126 to keep the power from the battery power supply unit 128 on to the left side power switching configuration 102. The left BSCU battery power enable/disable signal 146/150 is fed into a power switching logic circuit, as explained below, so that when the battery power switch is on, the left BSCU 126 can use the same left BSCU battery power enable/disable signal 146/150 to turn the EBAC 110/118 on and off without removing power from itself. If the battery switch is off, the BSCU removing this signal would cause the battery power to be removed from both itself and the EBACs. In this regard, since the EBACs are powered off during most of the flight, the reliability of the EBACs is improved. The left BSCU battery power enable/disable signal 146/150 may be, for example, a discrete signal that is either open or connected to ground.

The at least one left braking event signal 132 is generated by the left BSCU 126 and is indicative of occurrence of a braking event at the at least one left EBAC 110/118. As mentioned above, the BSCU monitors various airplane inputs to provide control functions such as, without limitation, pedal braking, parking braking, autobrake, and gear retract braking. In this regard, the left BSCU 126 transmits the brake command to the left EBACs 110/118 via the at least one left braking event signal 132/140. If the left braking event signal 132/140 indicates occurrence of a braking activity (such as landing) the left brake system reverts to getting power from the battery power supply unit 128 as explained in the context of FIGS. 2-3 below.

The at least one left braking power signal 133/141 may be, for example, a signal of about 130 volts. In this regard, an open/ground discrete signal is used for power switching, and then the actual power is sent from the EBPSU to the EBACs.

The right side power switching configuration 104 has a structure that is similar to the left side power switching configuration 102. Accordingly, the configuration and operation of these components will not be redundantly described herein. As shown in FIG. 1, the right side power switching configuration 104 may generally include: at least one right BSCU 168, at least one right EBAC 152/160, at least one right EBPSU 156/164 which includes at least one right power switching logic circuit 158/166, at least one active power supply unit 154/162, and the battery power supply unit 128.

This configuration 104 may be adapted to receive, transmit, exchange, or otherwise process a number of data and/or control signals. These signals may include, without limitation: at least one active power signal 174/182, a battery power signal 176, at least one right BSCU battery power enable/disable signal 186/190, at least one right braking event signal 172/180, at least one braking power signal 173/181, a battery ON/OFF switch signal (not shown in FIG. 1) and at least one right power distribution signal (reference numbers 170/178/184/188).

Figure 2:
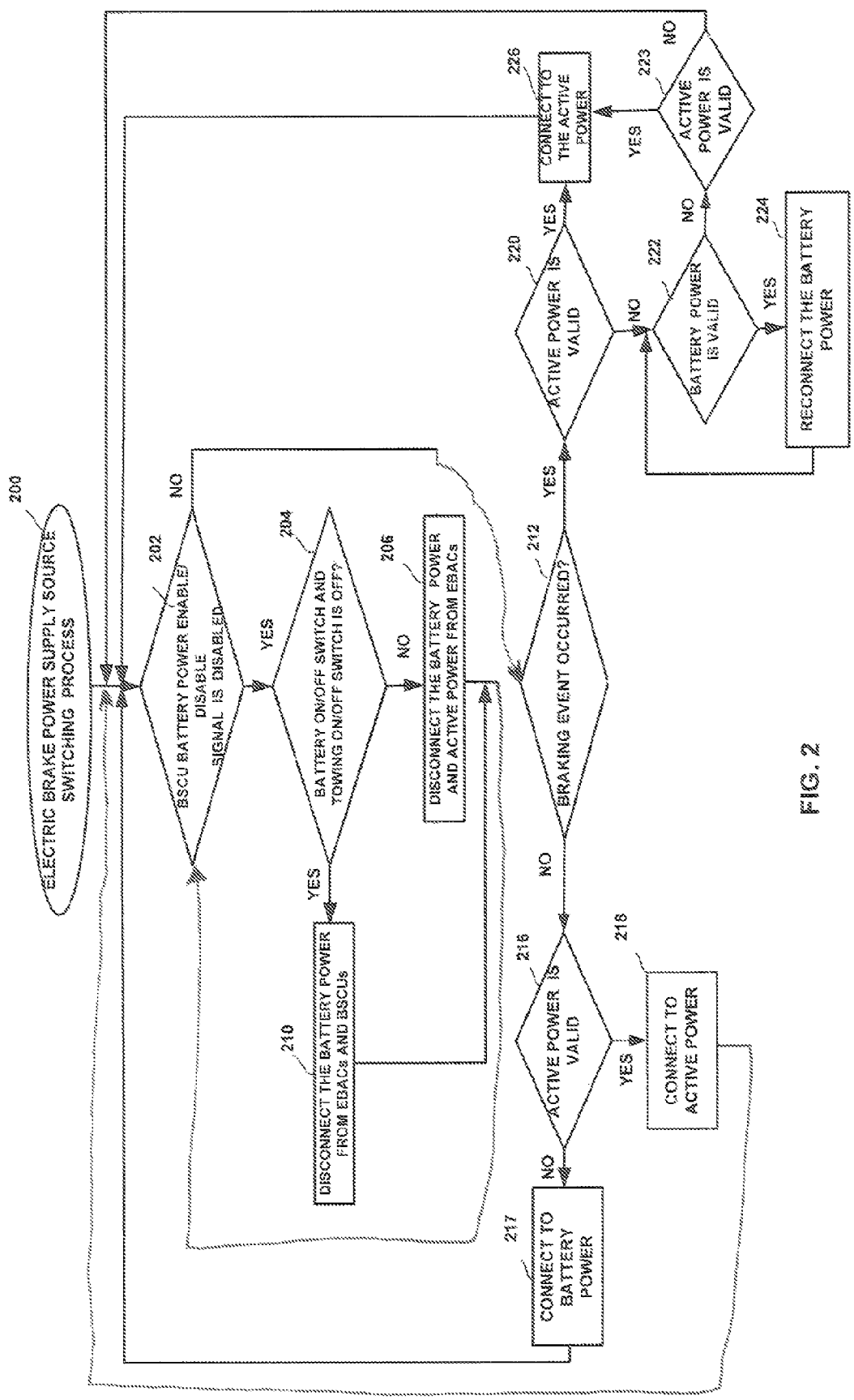
FIG. 2 is a flow chart illustrating a process for switching power for an aircraft electric brake system.

FIG. 2 is a flow chart illustrating a process for switching power sources for an aircraft electric brake system according to an example embodiment of the invention. Process 200 receives control signals from the BSCUs and the aircraft power supply units and removes the battery power from EBACs and/or the BSCUs during flight. Additionally, process 200 switches between the power supply units based upon the received control signals. The various tasks performed in connection with process 200 may be performed by software, hardware, firmware, or any combination thereof. For illustrative purposes, the following description of process 200 may refer to elements mentioned above in connection with FIG. 1. In practical embodiments, portions of process 200 may be performed by different elements of a system, e.g., at least one BSCU, at least one EBAC, at least one EBPSU, at least one power switching logic circuit 116/124, at least one active power supply unit, or a battery power supply unit.

Process 200 may begin by inquiring whether a BSCU battery power enable/disable signal is disabled (inquiry task 202). If the BSCU battery power enable/disable signal is not disabled, process 200 continues to check if a braking event occurred. If the battery power enable/disable signal is disabled (inquiry task 202), process 200 inquires, whether the battery switch and the towing switch is OFF (inquiry task 204). If the battery switch and the towing switch is OFF, process 200 removes/disconnects the battery power from the BSCUs and the EBACs (task 210) during the flight. In other words, process 200 switches out the battery power supply unit such that it no longer powers the electric brake system. If either the battery switch or towing switch is on, process 200 disconnects the battery power supply unit and active power supply unit only from the EBACs (task 206) during flight. This allows the one signal to do two different functions based upon the state of the battery switch, and removes the need for having two signals between the BSCU and the EBPSU. If the battery switch or the towing switch is ON (inquiry task 204), then process 200 disconnects the battery power supply unit and the active power supply unit from the EBACs (task 206) during the flight.

As a result of either task 206 or task 210, the power remains disconnected until the BSCU battery power enable/disable signal is not disabled. At that point, whether a braking event has occurred is checked by inquiry task 212. The braking event, as explained above, may be pedal braking, parking braking, auto braking, gear retract braking, or the like, and the braking event is indicated by a braking event signal (such as a 130 volt control signal).

If a braking event occurs (inquiry task 212) process 200 checks whether the active power is valid (inquiry task 220). If the active power is valid (inquiry task 220), then the EBACs and the BSCUs switch to get power from the active power supply units (task 226), and process 200 leads back to task 202. However, if the braking event has occurred (inquiry task 212) and the active power is not valid then process 200 checks whether battery power is valid (inquiry task 222). If the battery power is valid, then process 200 reconnects the battery power supply unit (task 224) to the EBACs and BSCUs and remains connected until the battery power is not valid (inquiry task 222). In this regard, task 224 leads back to inquiry task 222 and keeps checking the validity of the battery power supply unit. The EBACs and the BSCUs remain connected to the battery power while braking is commanded. When getting power from the battery power supply unit, process 200 does not allow switching back to the active power unless the battery power supply until is invalid (inquiry task 222). In other words, if the active power (TRU) comes back during the braking event, process 200 does not switch to the TRU until braking is over. This will constrain the switching to only one transition from the TRU to the battery power and prevents possible power transients to the BSCUs. If the battery power supply unit is invalid (inquiry task 222) and the active power is valid (inquiry task 223) then EBACs and the BSCUs connect to active power supply (task 226). If the braking event occurs (inquiry task 212), and the active power is not valid (inquiry tasks 220 and 223) and the battery power is also not valid (inquiry task 222), process 200 leads back to task 202 and no power switching occurs.

If a braking event does not occur (inquiry task 212), and the active power is valid (inquiry task 216), then the EBACs and the BSCUs switch to get power from the active power supply units (task 218), and process 200 leads back to task 202. If the braking event does not occur (inquiry task 212), and the active power is also not valid (inquiry task 216), process 200 connects to the battery power supply unit (task 217) and leads back to task 202.

The process 200 may be performed by one or more suitably configured power switching logic circuits 300 as explained below. The power switching logic circuit 300 receives the control signals from the BSCU and the power supply units, and switches (connects/disconnects) power sources for the EBACs, and/or for the BSCUs based upon the control signals as explained below. In one embodiment, the power switching logic circuit 300 switches the power for the EBACs off during the flight. In this regard, power is saved.

Figure 3:
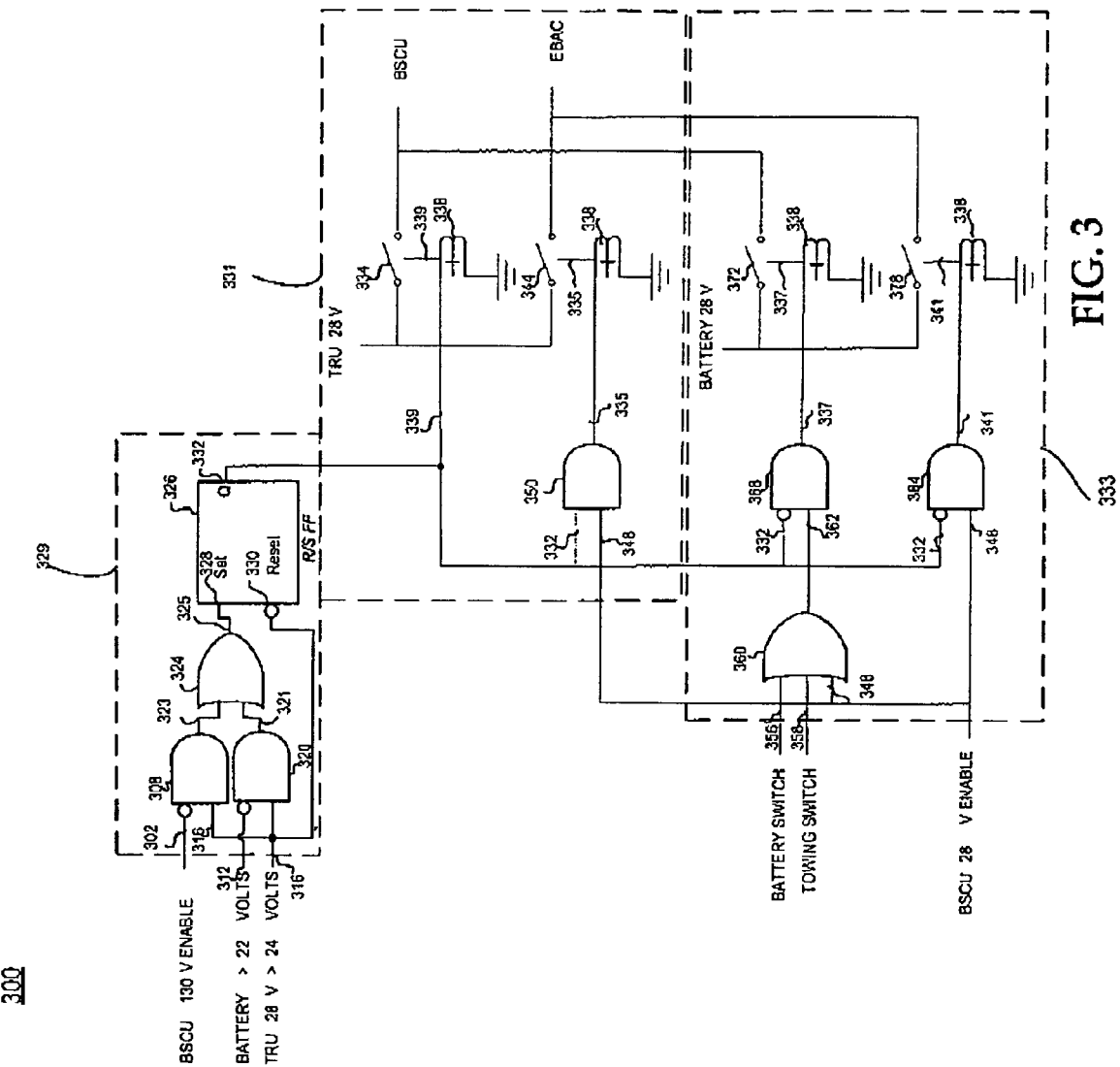
FIG. 3 illustrates an example embodiment of a logic circuit for switching power for an aircraft electric brake system.

FIG. 3 illustrates a power switching logic circuit 300 that is suitable for use with an aircraft electrical braking system for switching power according to an example embodiment of the invention. Power switching logic circuit 300 may include: an active power/battery decision circuit 329, an active power (TRU 28 volt) switching circuit 331, and a battery power (BATTERY 28 volt) switching circuit 333. In practice, these elements may be coupled together in the illustrated arrangement using any suitable interconnection architecture. The system 300 described herein can be applied to any number of power switching logic circuit configurations for an aircraft, and circuit 300 is depicted to illustrate one of many possible examples.

Active power/battery decision circuit 329, determines whether the TRU or the battery provide power to the brakes; the active power switching circuit 331, determines additional conditions for when active power is switched to the brakes; and the power switching circuit 333, determines additional conditions for when battery power is switched to the brakes.

The active power/battery decision circuit 329 determines whether the TRU or the battery should provide power to the brakes by processing received control signals indicating the status of aircraft systems. In this example embodiment, the TRU/battery decision circuit 329 receives and/or processes a plurality of control signals which may include: an active power signal 316 (which is a logic high value when the TRU voltage is greater than 24 volts and is otherwise a logic low value); a battery power signal 312 (which is a logic high value when the battery voltage is greater than 22 volts and is otherwise a logic low value); a braking event signal 302 (which is a logic high value when the 130 volt BSCU enable/disable signal is enabled and is otherwise a logic low value). The TRU/battery decision circuit 329 may include: a flip flop circuit 326 and a plurality of logic gates 308/320/324.

The flip flop circuit 326 includes: a set input 328, a reset input 330, and a Q output 332. The flip flop circuit is any standard flip flop circuit and is configured to prevent toggling from the battery power to the active power supply as explained below. The reset input 330 is configured to receive the active power signal 316. When the active power signal 316 is low, the Q output 332 is set low and the set input 328 is ignored. As will be explained below, the Q output 332 set low indicates the TRU voltage is not greater than 24 V and the TRU should not be used. When the active power signal 316 is high, the Q output 332 is controlled by the set input 328. Those skilled in the art are familiar with flip flop truth table, the flip flop circuits, and the general manner in which they are controlled, and such known aspects will not be described in detail here.

The set input 328 is configured to receive an output signal 325 from a logic gate 324 which may be an OR gate that receives the output signals 321/323 and produces the output signal 325 depending on the received signals 321/323. If either of signals 321 or 323 is logic high the output signal 325 is logic high.

The logic gates 308/320/324 each having a plurality of inputs and an output, and may be, without limitation, any standard logic gates designed to carry out the operation of the TRU/battery decision circuit 329 suitable for aircraft electric brake systems as explained below. The logic gate 308 is an AND gate configured to receive the inverted value of the braking event signal 302 and the active power signal 316, and produce an output signal 323 depending on the received signals 302/316. The logic gate 320 is an AND gate configured to receive the inverted value of the battery power signal 312 and the active power signal 316, and produce an output signal 321 depending on the received signals 312/316. When the active power signal 316 is low, both output signal 323 and output signal 321 are set low. When the active power signal 316 is high, the output signal 323 has the value of the inverted value of the braking event signal 302, and the output signal 321 has the value of the inverted value of the battery power signal 312. Therefore, if the TRU voltage is greater than 24 V and (either the battery voltage is not greater than 22 volts, or the 130 volt BSCU enable/disable signal is disabled), then the output signal 325 is set to logic high. Logic gate 324, which is explained above, produces the output signal 325 to be fed to the flip flop circuit 326.

The output signal 325 and the active power signal 316 are fed to the flip flop circuit 326. As mentioned above, the flip flop circuit 326 is configured to prevent toggling from the battery power and the active power. For example, if the active power is operating intermittently, then Q output 332 may toggle between 0 and 1 and the switches may be opening and closing back and fourth. In this regard, the braking system may see many power transients. The flip flop circuit 326 prevents unintentional transition from the battery power supply unit to the active power supply unit. The flip flop circuit 326 makes sure once switched to getting power from the battery power source the BSCUs and/or the EBACs continue obtaining power from the battery power source unless the braking event signal 302 is invalid (braking event can not be detected) or the battery power source is invalid (battery voltage is less than 22 volts), and the active power source is valid (TRU voltage is greater than 28 volts). In this regard, the Q output 332 controls the active power switching circuit 331 and the battery power switching circuit 333 as explained below.

The active power switching circuit 331 determines additional conditions for when active power is switched to the brakes by receiving control signals. In this example embodiment, the active power switching circuit 331 receives and/or processes a plurality of control signals which may include: the Q output 332 and a BSCU power enable/disable signal 348. The Q output 332 is explained above. The BSCU power enable/disable signal 348 is a logic high value when the 28 volt BSCU enable/disable signal is enabled and is otherwise a logic low value.

The active power switching circuit 331 may include: a logic gate 350, a TRU-BSCU switch 334, a TRU-EBAC switch 344, a plurality of relays 338, and a plurality of relay control signals 339/335. The logic gate 350 is an AND gate and is configured to receive the control signals 332/348 and output the relay control signal 335 to control (close/open) the TRU-BSCU switch 334. The TRU-BSCU switch 334 is controlled by the relay control signal 339 and is configured to open/close to connect/disconnect the active power supply from the BSCU. The TRU-EBAC switch 344 is controlled by the relay control signal 335 and is configured to open/close to connect/disconnect the active power supply form the EBACs. Notably, the switches 334/344 are shown in an open position (no signal flow) in FIG. 3. The relays 338 are configured to close/open the switches 334/344 using the relay control signals 339/335. The relay control signal 339 is controlled by the Q output 332 and is configured to close/open the TRU-BSCU switch 334. The relay control signal 335 is controlled by the logic gate 350 and is configured to close/open the TRU-EBAC switch 344.

The battery power switching circuit 333 determines additional conditions for when battery power is switched to the brakes by receiving control signals. In this example embodiment, the battery power switching circuit 333 receives and/or processes a plurality of control signals which may include: the Q output 332, the BSCU power enable/disable signal 348, a battery ON/OFF switch signal 356 and a towing ON/OFF switch signal 358. The battery power switching circuit 333 may include: a plurality of logic gates 368/384/360, a BAT-BSCU switch 372, a TRU-EBAC switch 378, a plurality of relays 338, and a plurality of relay control signals 337/341.

BSCU battery power enable/disable signal 348 is explained above. The battery ON/OFF switch signal 356 is a logic high value when the battery is switched on and is a logic low value when the battery is switched off, and the towing ON/OFF switch signal 358 is a logic high value when the towing mode is switched on and is a logic low value when the towing mode is switched off. The battery ON/OFF switch and the towing ON/OFF switch are physical switches that a pilot can control to connect to the battery power supply unit to operate equipment in the two modes.

Each of the logic gates 360/368/384 has a plurality of inputs and an output, and each may be, without limitation, any standard logic gate designed to carry out the operation of the logic circuit 333 suitable for aircraft electric brake systems as explained below.

The logic gate 360 is a thee-input one-output OR gate and is configured to receive the battery ON/OFF switch signal 356, the towing ON/OFF switch signal 358, and the BSCU battery power enable/disable signal 348. Output 362 of the logic gate 360 is fed to the logic gate 368.

The logic gate 368 may be a two-input one-output AND gate and is configured to receive the Q output 332 and the output of the logic gate 360 (signal 362) and output the relay control signal 337 to control (close/open) the BAT-BSCU switch 372. The BAT-BSCU switch 372, is controlled by the relay signal 337 and is configured to open/close to connect/disconnect the battery power supply unit form the BSCU.

The logic gate 384 may be a two-input one-output AND gate and is configured to receive the Q output 332 and the BSCU power disable/enable signal 348 and output the relay control signal 341 to control (close/open) the BAT-EBAC switch 378. The BAT-EBAC switch 378, is controlled by the relay control signal 341 and is configured to open/close to connect/disconnect the active power supply form the EBACs.

Notably, the switches 372/378 are shown in an open position (no signal flow) in FIG. 3. The relays 338 are configured to close/open the switches 372/378 using the relay control signals 337/378. The relay control signal 337 is controlled by the logic gate 337 and is configured to close/open the BAT-BSCU switch 372. The relay control signal 341 is controlled by the logic gate 384 and is configured to close/open the BAT-EBAC switch 378.

In one example embodiment, the power switching logic circuit 300 may operate as follows: If the active power signal 316 is valid (TRU voltage >24 volt) and the battery power signal 312 is not valid (battery voltage <22 volt) then Q output 332 is logic high. In this regard, the power switching logic circuit 300 reverts to obtaining power from active power source. In this example, the TRU-EBAC switch 344 and the BSCU-TRU switch 334 are both closed allowing the EBAC/BSCU to obtain power from the TRU. Switches 372/378 both being open thereby not allowing passage of the BSCU power enable/disable signal 348, causes the battery power source to connect to EBAC/BSCU.

In another example embodiment, the power switching logic circuit 300 may operate as follows: When the battery switch signal 356 or the towing switch signal 358 (inputs to the logic gate 360) is on (logic high) and the Q output 332 is logic low or logic high, the BSCU can turn the EBAC on/off by enabling/disabling the BSCU power enable/disable signal 348. For example, when the battery switch signal 356 is on, the BSCU disconnects the EBAC from the battery power by setting the BSCU enable/disable signal 348 to disable (logic low). In this regard, switch 372 closes (relay control signal 337 is logic high at the output of the logic gate 368) allowing the battery power supply unit to supply power to BSCU, and switch 378 opens (relay control signal 339 is logic low at the output of the logic gate 384) to prevent the battery power supply unit from supplying power to the EBAC.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A system for switching power for an electric brake system, the system comprising:
   a brake system control unit configured to generate at least one power control signal, wherein the at least one power control signal is configured to switch a battery power off from an electric brake system during flight and switch said battery power on to said electric brake system in the case of a braking event and in the case only said battery power is available to power said electric brake system upon the occurrence of said braking event; and at least one electric brake actuator control coupled to and controlled by the brake system control unit, the brake system control unit being configured to control switching of the battery power for the at least one electric brake actuator control in response to the at least one power control signal.

2. A system according to claim 1, further comprising:

at least one electric brake power supply unit coupled to the at least one electric brake actuator control and to the brake system control unit, wherein the at least one electric brake power supply unit is configured to supply power to the brake system control unit and to the at least one electric brake actuator control.

3. A system according to claim 2, further comprising:

at least one power switching logic circuit coupled to the at least one electric brake power supply unit, wherein the at least one power switching logic circuit is configured to switch power sources for the brake system control unit and for the at least one electric brake actuator control.

4. A system according to claim 3, wherein the power sources comprise:

at least one active power supply unit coupled to the at least one electric brake power supply unit, wherein the at least one active power supply unit is configured to supply active power to the at least one electric brake actuator control; and a battery power supply unit coupled to the at least one electric brake power supply unit, wherein the battery power supply unit is configured to supply power to the electric brake system.

5. A system according to claim 4, wherein:

the at least one power switching logic circuit is further configured to receive an active power signal indicative of validity of the at least one active power supply unit, and a battery power signal indicative of validity of the battery power supply unit.

6. A system for switching power for an aircraft electric brake system, the system comprising:

at least one electric brake power supply unit coupled to at least one electric brake actuator control and to a brake system control unit, wherein the at least one electric brake power supply unit is configured to supply power to the brake system control unit and to the at least one electric brake actuator control; and at least one power switching logic circuit coupled to the at least one electric brake power supply unit, wherein the at least one power switching logic circuit is configured to switch power sources for the brake system control unit and for the at least one electric brake actuator control;

wherein said power sources comprise a battery power supply unit and wherein said power switching logic circuit is configured to switch said battery power supply unit off during flight and switch said battery power supply unit on in the case of a braking event and in the case said battery power supply unit is the only power source available to supply power to said electric brake system upon the occurrence of said braking event.

7. A system according to claim 6, further comprising:

at least one active power supply unit coupled to the at least one electric brake power supply unit, wherein the at least one active power supply unit is configured to supply active power to the at least one electric brake actuator control; and said battery power supply unit coupled to the at least one electric brake power supply unit, wherein the battery power supply unit is configured to supply power to the electric brake system.

8. A system according to claim 7, wherein the at least one power switching logic circuit is further configured to receive:

at least one active power signal that is generated by the at least one active power supply unit, wherein the at least one active power signal is indicative of validity of the at least one active power supply unit;

a battery power signal that is generated by the battery power supply unit, wherein the battery power signal is indicative of validity of the battery power supply unit;

at least one battery power enable/disable signal that is generated by the brake system control unit and is configured to disconnect/connect the battery power supply unit from the at least one electric brake actuator control;

at least one braking event signal that is generated by the brake system control unit and is indicative of occurrence of a braking event at the at least one electric brake actuator control; and a battery on/off switch signal that is generated externally and is configured to initiate connecting/disconnecting of the battery power supply unit to/from the at least one electric brake actuator control.

9. A method for switching power for an electric brake system, the method comprising:

receiving a plurality of control signals from the aircraft electric brake system; and switching power sources for the aircraft electric brake system in response to the control signals;

wherein said power sources comprise a battery power supply unit and said switching comprises switching said battery power supply unit off during a flight and switching said battery power supply unit on in the case of a braking event and in the case said battery power supply unit is the only power source available to supply power to said electric brake system upon the occurrence of said braking event.

10. A method according to claim 9, wherein the receiving step further comprises receiving:

an active power signal that indicates validity of an active power supply unit;

a battery power signal that indicates validity of said battery power supply unit;

a power enable/disable signal that controls whether or not the battery power supply unit is coupled to an electric brake actuator control;

a braking event signal that is indicative of occurrence of said braking event at the electric brake actuator control;

a battery on/off switch signal that is configured to initiate disconnecting/connecting the battery power supply unit from/to the electric brake actuator control; and a towing on/off switch signal that is configured to initiate disconnecting/connecting the battery power supply unit from/to the electric brake actuator control.

11. A method according to claim 10, wherein the switching step further comprises disconnecting the battery power supply unit from the electric brake actuator control and a brake system control unit during a flight if:

the battery on/off switch signal is off;

the towing on/off switch signal is off; and the power enable/disable signal is disabled.

12. A method according to claim 10, wherein the switching step further comprises disconnecting the battery power supply unit and the active power from the electric brake actuator during a flight if the power enable/disable signal is not disabled.

13. A method according to claim 10, wherein the switching step further comprises connecting the battery power supply unit to the electric brake actuator control if:

the braking event occurred;

the active power supply unit is not valid; and the battery power supply unit is valid.

14. A method according to claim 10, wherein the switching step further comprises connecting the active power to the electric brake actuator control if:

the braking event did not occur; and the active power supply unit is valid.

15. A method according to claim 10, wherein the switching step further comprises connecting to the battery power supply if:

the braking event has occurred; and the active power is not valid.

16. A method according to claim 10, wherein the switching step further comprises keeping the battery power supply unit connected to the electric brake system unless:

the braking event has occurred;

the active power is valid; and the battery power supply unit is not valid.

17. A system according to claim 1, wherein said at least one power control signal is configured such that said battery power remains on until said braking event is completed.

18. A system according to claim 6, wherein said power switching logic circuit is configured such that said battery power supply unit remains on until said braking event is completed.

19. A method according to claim 11, wherein said battery power supply unit remains on until said braking event is completed.

* * * * *